US005805104A

United States Patent [19]
Kunert

[11] Patent Number: 5,805,104
[45] Date of Patent: Sep. 8, 1998

[54] PROCESS FOR MEASURING THE RELATIVE DISTANCE AND SPEED OF AN OBJECT IN RELATION TO A PERIODICALLY FREQUENCY-MODULATED CONTINUOUS WAVE RADAR

[75] Inventor: Martin Kunert, Geisling, Germany

[73] Assignee: Siemens Automotive, S.A., Toulouse, France

[21] Appl. No.: 643,636

[22] Filed: May 6, 1996

[30] Foreign Application Priority Data

May 5, 1995 [FR] France .................................. 95 05505

[51] Int. Cl.⁶ .............................. G01S 13/06; G01S 13/58
[52] U.S. Cl. ......................... 342/109; 342/128; 342/129; 342/70
[58] Field of Search ................................. 342/70, 71, 72, 342/109, 128, 129

[56] References Cited

U.S. PATENT DOCUMENTS

| | | | |
|---|---|---|---|
| 4,118,701 | 10/1978 | Brey et al. | 342/128 |
| 4,435,712 | 3/1984 | Kipp | 342/128 |
| 4,618,863 | 10/1986 | Collins | 342/194 |
| 4,620,192 | 10/1986 | Collins | 342/128 |
| 4,912,472 | 3/1990 | Reits | 342/128 |
| 4,968,980 | 11/1990 | Schmucker | 342/68 |
| 5,023,618 | 6/1991 | Reits | 342/128 |
| 5,274,380 | 12/1993 | Yatsuka et al. | 342/70 |
| 5,349,358 | 9/1994 | Canal | 342/128 |
| 5,381,153 | 1/1995 | Saito et al. | 342/70 |
| 5,521,600 | 5/1996 | McEwan | 342/27 |
| 5,619,208 | 4/1997 | Tamatsu et al. | 342/70 |

FOREIGN PATENT DOCUMENTS 40 40 572  6/1992  Germany.

*Primary Examiner*—John B. Sotomayor
*Attorney, Agent, or Firm*—Herbert L. Lerner; Laurence A. Greenberg

[57] ABSTRACT

A process for measuring the relative distance and speed of an object in relation to a periodically frequency-modulated continuous wave radar includes extracting the distance and the speed by combining beat frequencies derived from a mixture of emitted and reflected signals being respectively obtained during ascending and descending alternations of a modulation. The distance and the speed of an object at each half-period are calculated from beat frequencies of two immediately preceding alternations.

5 Claims, 2 Drawing Sheets

PROCESS FOR MEASURING THE RELATIVE DISTANCE AND SPEED OF AN OBJECT IN RELATION TO A PERIODICALLY FREQUENCY-MODULATED CONTINUOUS WAVE RADAR

BACKGROUND OF THE INVENTION

Field of the Invention

The present invention relates to a process for measuring of the relative distance and speed of an object in relation to a periodically frequency-modulated continuous wave radar, and more specifically to a process of that type which enables an improvement in the precision of the measurements being taken.

The periodic utilization of a frequency-modulated continuous wave radar, which is more commonly known by the designation FMCW radar, for measuring the relative distance and speed of an object is well known, for example from the book entitled "Introduction to Radar Systems" by M. I. Skolnik, published in 1962 by McGraw-Hill (see pp. 86 and those that follow). The use of a radar of that type for measuring the distances and speeds of automobiles is known from German Published, Non-Prosecuted Patent Application DE 40 40 572 A1, corresponding to Published International Application WO 92 11543. In the process used in the prior art, a carrier frequency is modulated, for example by a triangular signal, that modulated signal is emitted continuously and a fraction of that signal is mixed with the signal reflected by the object having a distance and speed which are to be measured. Thus two beat frequencies are obtained, which respectively correspond to the ascending alternation and the descending alternation of the modulation signal of the emitted signal. At the end of each modulation period, the distance is derived from the average of the beat frequencies and the speed is derived from the difference of the beat frequencies. However, in order to obtain measurements having a precision which is compatible with a utilization in the automobile field, in which distances and speeds vary rapidly, it is necessary, as in the prior art cited, to use very high-modulation frequencies, in order obtain very short ramp times on the order of one millisecond, so as to avoid errors due to variations in speed and distance during the measurement. That involves the use of expensive high-performance materials in order to allow the signals to be processed.

SUMMARY OF THE INVENTION

It is accordingly an object of the invention to provide a process for measuring the relative distance and speed of an object in relation to a periodically frequency-modulated continuous wave radar, which overcomes the hereinafore-mentioned disadvantages of the heretofore-known methods of this general type and which makes it possible to increase precision using equivalent materials, or to obtain equivalent precision using more economical materials.

With the foregoing and other objects in view there is provided, in accordance with the invention, a process for measuring the relative distance and speed of an object in relation to a periodically frequency-modulated continuous wave radar, which comprises extracting distance and speed by combining beat frequencies derived from a mixture of emitted and reflected signals being respectively obtained during ascending and descending alternations of a modulation; and calculating distance and speed of an object at each half-period from beat frequencies of two immediately preceding alternations.

In accordance with another mode of the invention, the values of the distance and the speed obtained at the even and odd half-periods, respectively, each determine two envelopes which frame the real values of the distance and the speed, respectively.

In accordance with a further mode of the invention, a change in the direction of variation of the distance or the speed is deduced from the crossing of these two envelopes.

In accordance with an added mode of the invention, the distance and the speed of the object calculated at each half-period are weighted by those calculated at the preceding half-period.

In accordance with a concomitant mode of the invention, the real values of the distance and the speed are estimated an average of the two immediately preceding measurements.

Other features which are considered as characteristic for the invention are set forth in the appended claims.

Although the invention is illustrated and described herein as embodied in a process for measuring the relative distance and speed of an object in relation to a periodically frequency-modulated continuous wave radar, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
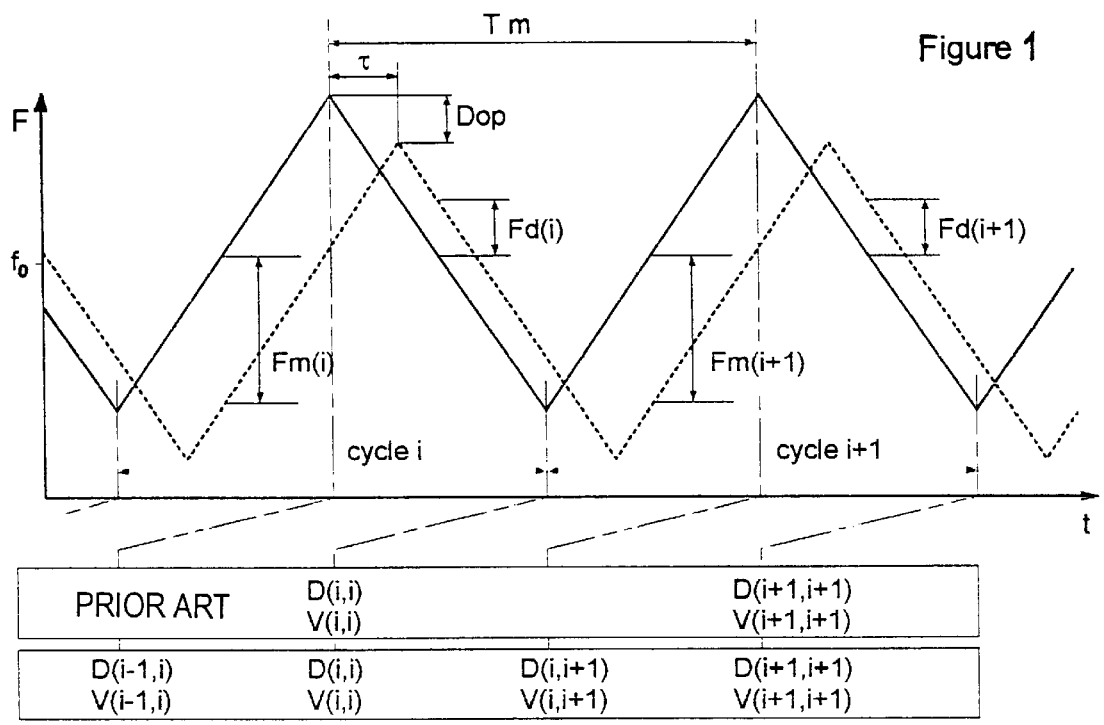
FIG. 1 is a time graph of signals emitted and received by radar, as well as measurements taken from them.

Referring now to the figures of the drawings in detail and first, particularly, to FIG. 1 thereof, there is seen a solid line which represents two modulation cycles (i and i+1) of a signal emitted by radar, and a broken line that represents a signal reflected by an object. It will be noted that these signals are offset relative to one another, along the time axis on the abscissa. That offset $\tau$ represents a wave propagation time, that is a function of the distance from the object to the radar. These signals are also offset relative to one another along the frequency axis on the ordinate. That offset Dop is representative of the relative speed of the object in relation to the radar, due to the Doppler effect. Beat frequencies obtained by the mixture of these two signals have been respectively labeled Fm(i) for the frequency which corresponds to an ascending alternation and Fd(i) for the frequency which corresponds to a descending alternation of the cycle i, and Fm(i+1) and Fd(i+1) for the cycle i+1. Classically, in the prior art, at the end of the cycle i (or i+1, respectively), the relative distance and speed of the object is extracted by combining the beat frequencies. The distance and the speed, designated D(i,i) and V(i,i), were obtained from the beat frequencies Fm(i) and Fd(i) according to the equations:

$$D(i,i) = \frac{Tm \cdot c}{8 \cdot \Delta F} (Fm(i) + Fd(i)) \quad (1)$$

$$V(i,i) = \frac{c}{4 \cdot f_0} (Fd(i) - Fm(i)) \quad (2)$$

in which c is the speed of light, Tm is the period of the modulation signal, $\Delta F$ is the frequency deviation of the radar and $f_0$ is the center frequency of the radar.

Although these values were obtained at the end of the cycle i, they correspond to the average real values during the cycle, that is considering a linear evolution of the values during the cycle time, to the real values at an instant $t_i$, the mid-point of the cycle.

According to the invention, intermediate values D(i,i+1)) and V(i,i+1) are also calculated from the frequency Fd(i) which corresponds to the descending alternation of the cycle i and from the frequency Fm(i+1) which corresponds to the ascending alternation of the cycle i+1. Thus, it is noted that one piece of distance and speed information is obtained per half-period, that is twice as much information per radar as in the prior art, which allows more precise monitoring of the evolution of these variables.

Figure 2:
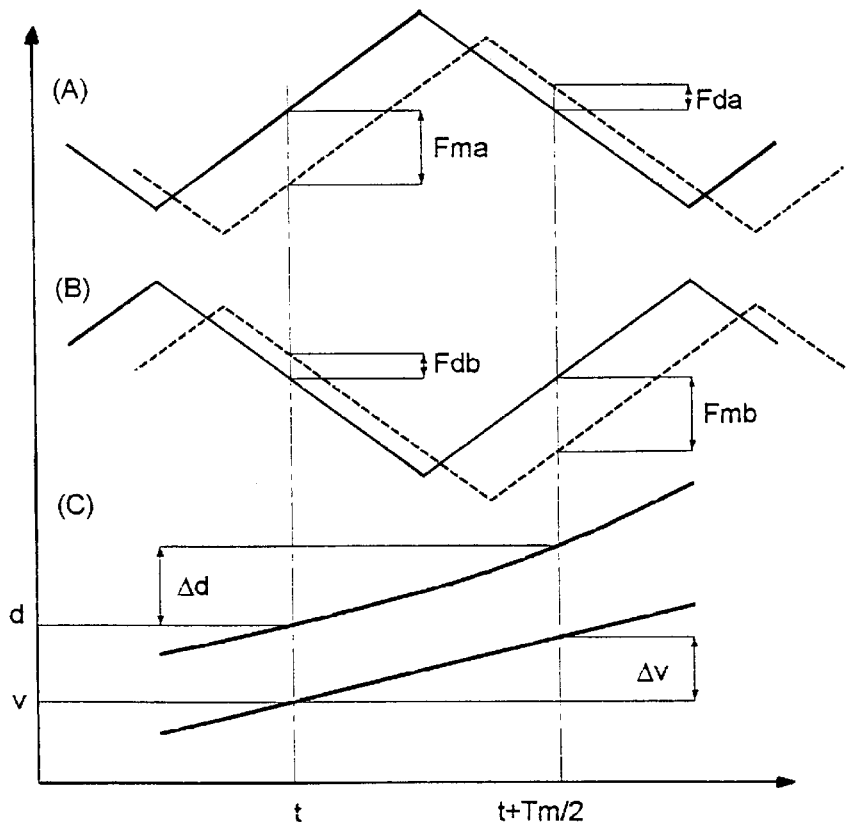
FIG. 2 is a diagram which is useful to the understanding of an advantageous characteristic of this process.

An important characteristic of the invention will now be described in conjunction with FIG. 2. The measurements of distance and speed obtained previously are only approximations of the real variables. In fact, in addition to the pure delay linked to the fact that it is necessary to wait for the two beat frequencies to be measured and for the calculations to be carried out, a delay which can be compensated by an offset of one half-period, as shown in the drawing of FIG. 1, an additional error occurs when distance and speed vary during the measurement time, an error which is proportionally greater to the extent that this variation is large, and having a sign which varies as a function of the direction of variation of the variables being measured. In order to illustrate this characteristic, the signals emitted and received by two identical radars A and B having a modulation which is in phase opposition are shown as a function of time in diagrams (A) and (B), and curves representing the evolution of the distance and the speed of an object are shown in a diagram (C). An expression of the beat frequencies as a function of the distance and the speed is derived from the preceding equations (1) and (2):

$$Fm = K1 \cdot D - K2 \cdot V \quad (3)$$

$$Fd = K1 \cdot D + K2 \cdot V \quad (4)$$

in which expression, K1 and K2 are the coefficients obtained with the resolution of the system of equations (1) and (2), the full development of which has purposely been omitted in order to simplify the description.

At an instant t, the values of the distance and the speed are respectively d and v, and the beat frequencies are respectively Fma for the radar A and Fdb for the radar B. At an instant t+Tm/2, a half-period later, the values of the distance and the speed become d+$\Delta$d and v+$\Delta$v and the corresponding beat frequencies are Fda and Fmb for the radars A and B, respectively. By expressing these beat frequencies as a function of the corresponding distances and speeds through the equations (3) and (4), and then calculating distance values Da and Db and speed values Va and Vb given by the radars A and B through the equations (1) and (2), it is possible to determine that the two radars do not give the same result:

For radar A: Da=d+½ $\Delta$d−k$\Delta$v  Va=v+½$\Delta$v−1/k$\Delta$d For radar B: Db=d+½$\Delta$d+k$\Delta$v  Vb=v+½$\Delta$v+1/k$\Delta$d in which in this case again the coefficient k is the result of a calculation which has not been developed for reasons of simplification.

It is noted that in effect the distance obtained roughly corresponds to the average distance, with an absolute value error |k $\Delta$v| and an opposite sign error between the two radars. The same observation is applicable to the measurement of the speed. Thus, it was determined that for the same average value of distance or speed during a measurement cycle, the values obtained from sequences in phase opposition make it possible to define a framing for this value. Therefore, it appears that by using the process according to the invention, and thus by calculating the relative distance and speed of the object in relation to the radar at each half-period, values which are overestimated or underestimated relative to the real values, as a function of the direction of variation of the latter, are obtained. This is shown in the following table, in which the half-period at the end of which a result is calculated from an ascending then descending alternation of the modulation signal is arbitrarily called "even", and conversely, the half-period at the end of which a result is calculated from a descending then ascending alternation is called "odd".

| Direction of distance variation | Direction of speed variation | Even half-period | Odd half-period |
|---|---|---|---|
| increasing D | increasing V | D < real D  V < real V | D > real D  V > real V |
| increasing D | decreasing V | D > real D  V > real V | D < real D  V < real V |
| decreasing D | increasing V | D < real D  V > real V | D > real D  V < real V |
| decreasing D | decreasing V | D > real D  V < real V | D < real D  V > real V |

This characteristic is advantageously used, in the process according to the invention, to determine two envelope curves obtained by linking the measurements taken at the respective even and odd half-periods. It may be determined from the example illustrated in FIG. 3, in which the different curves of the speed V and the distance D are respectively represented as a function of half-periods N. A solid line traces the real curve, a dotted line traces the envelope curve obtained by linking the measurements taken at the odd half-periods and a dot-dash line traces the curve related to the even half-periods. It is useful to note that this last envelope would correspond to the measurement taken by the known processes of the prior art, using the same material. It is noted that when there is a change in the direction of variation of the speed, as is shown herein at a half-period 7, for example, the two envelope curves cross each other, both for the speed and for the distance, which corresponds to the case of the first two lines of the table. In the prior art, this change in the direction of variation would not be detectable until a half-period 10, with the calculation of a speed lower than the speed calculated at the preceding even half-period (a half-period 8). On the contrary, through the use of the process according to the invention, this change is detected at a half-period 9 in which the calculation of the speed reveals a crossing of the envelopes.

Figure 3A:
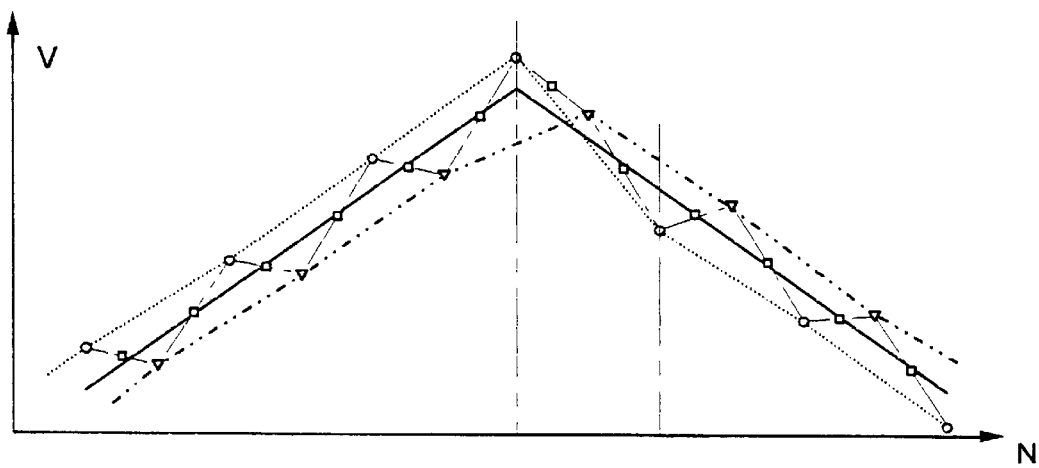
FIG. 3 is a diagram showing an example of measurements produced by this process.
Figure 3B:
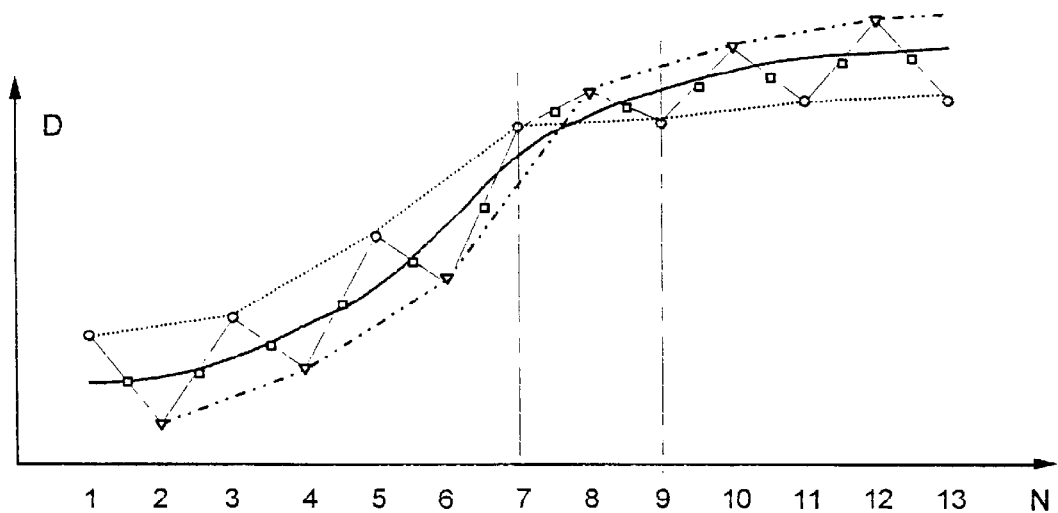

It can also be determined that, in accordance with another advantageous characteristic, by weighting each measurement by the measurement taken at the preceding half-period, for example by forming the average of these two measurements, the precision of the measurement is greatly improved. In effect, as is shown in FIG. 3 by square-shaped symbols located on a zigzag line linking the successive measurements, the average obtained between two successive measurements makes it possible to eliminate these opposite sign errors almost completely, and makes it possible to obtain a curve which is very close to the real curve, in contrast with the envelope which links the measurements of the even half-periods which, as seen previously, corresponds to the measurements that can be produced with the same material in the prior art.

Thus, it has been shown that the process according to the invention makes it possible to obtain better precision using a less costly material than that required by the known processes, because it uses lower-modulation frequencies of the signal emitted by the radar. By way of example, with this process, modulations with a period of 30 milliseconds make it possible to obtain measurements that are compatible with the demands of highway traffic control.

It is understood that although the process has been described by using FMCW radars having a frequency modulation which is in triangular form, the invention may be extended to any form of periodic modulation such as sinusoidal or trapezoidal modulation.

I claim:

1. A process for measuring the relative distance and speed of an object in relation to a periodically frequency-modulated continuous wave radar, which comprises:

extracting distance and speed by combining beat frequencies derived from a mixture of emitted and reflected signals being respectively obtained during ascending and descending alternations of a modulation; and calculating distance and speed of an object at each half-period from beat frequencies of two immediately preceding alternations.

2. The process according to claim 1, which comprises determining two envelopes framing respective real values of the distance and the speed with each of values of the distance and the speed respectively obtained at even and odd half-periods.

3. The process according to claim 2, which comprises deducing a change in direction of a variation of the distance or the speed from a crossing of the two envelopes.

4. The process according to claim 1, which comprises weighting the distance and the speed of the object calculated at each half-period by those calculated at a preceding half-period.

5. The process according to claim 4, which comprises estimating real values of the distance and the speed by an average of two immediately preceding measurements.

* * * * *